United States Patent
Adachi

(10) Patent No.: US 8,493,581 B2
(45) Date of Patent: Jul. 23, 2013

(54) ELECTRONIC DOCUMENT HAVING AUTHENTICATION FUNCTION

(75) Inventor: Masaharu Adachi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1653 days.

(21) Appl. No.: 11/497,121

(22) Filed: Jul. 31, 2006

(65) Prior Publication Data

US 2007/0030515 A1    Feb. 8, 2007

(30) Foreign Application Priority Data

Aug. 4, 2005    (JP) .................................. 2005-226826

(51) Int. Cl.
*G06K 15/00*    (2006.01)

(52) U.S. Cl.
USPC .......... 358/1.14; 358/1.1; 358/1.15; 358/3.28; 713/150; 713/168; 713/176; 713/184; 726/5

(58) Field of Classification Search
USPC ................. 358/1.1, 1.15, 3.28; 713/150, 168, 713/176; 283/13
See application file for complete search history.

(56) References Cited

U.S. PATENT DOCUMENTS

| | | | |
|---|---|---|---|
| 5,606,609 A * | 2/1997 | Houser et al. ................. | 713/179 |
| 6,237,099 B1 * | 5/2001 | Kurokawa ......................... | 726/4 |
| 6,599,324 B2 | 7/2003 | Saito et al. | |
| 7,810,137 B1 * | 10/2010 | Harvey et al. ...................... | 726/4 |
| 2003/0056100 A1 * | 3/2003 | Beatson ......................... | 713/176 |

FOREIGN PATENT DOCUMENTS

| | | |
|---|---|---|
| JP | 2000-64344 | 2/2000 |
| JP | 2001-256190 | 9/2001 |
| JP | 2003-6028 | 1/2003 |
| JP | 2005-141746 | 6/2005 |
| TW | 474080 | 1/2002 |

OTHER PUBLICATIONS

Jan. 25, 2008 Chinese official action (with English translation) in connection with corresponding Chinese patent application No. 22006101009649.
"Setting a password for a word document" (Translated Title) China Academic Journal Electronic Publishing House Jul. 2003.
Sep. 11, 2009 Taiwanese official action (and English translation thereof) in connection with a counterpart Taiwanese patent application No. 95128694.

* cited by examiner

*Primary Examiner* — Benny Q Tieu
*Assistant Examiner* — Martin Mushambo
(74) *Attorney, Agent, or Firm* — Cooper & Dunham LLP

(57) ABSTRACT

A method of creating an electronic document is disclosed that is able to maintain confidentiality and prevent leakage (unauthorized disclosure) of contents of the electronic document. The method includes the steps of sustaining plural combinations of first data sets and second data sets respectively corresponding to the first data sets in advance; obtaining a first data set and a second data set via a verification data input field provided on a predetermined page of a document opened and displayed in response to an instruction input from in input unit for opening the document; and performing, when the first data set and the second data set are in agreement with one of the combinations, at least one of an operation of not displaying a first object in which content of the document is shielded, an operation of displaying a second object which includes the content of the document, and an operation of loading the input first data set into a third object able to display the first data set, and displaying the third object.

21 Claims, 13 Drawing Sheets

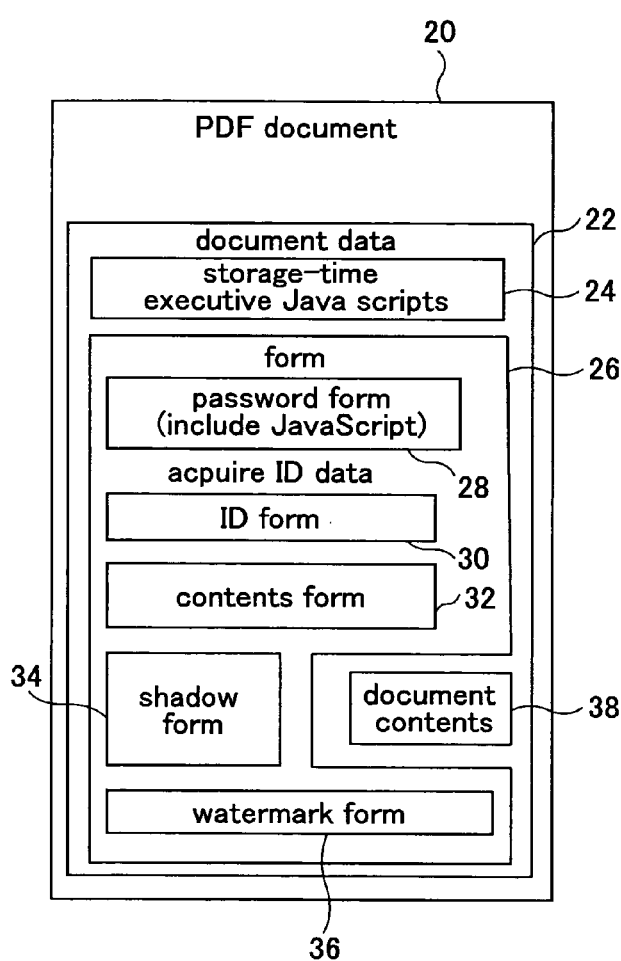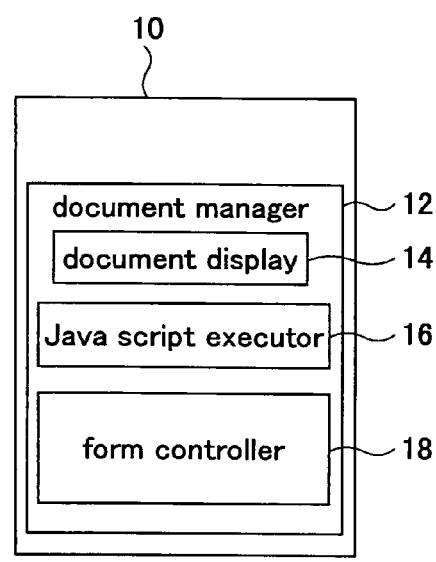

ID :aaa@aaa.com
Pwd : other than "aaa"

no change

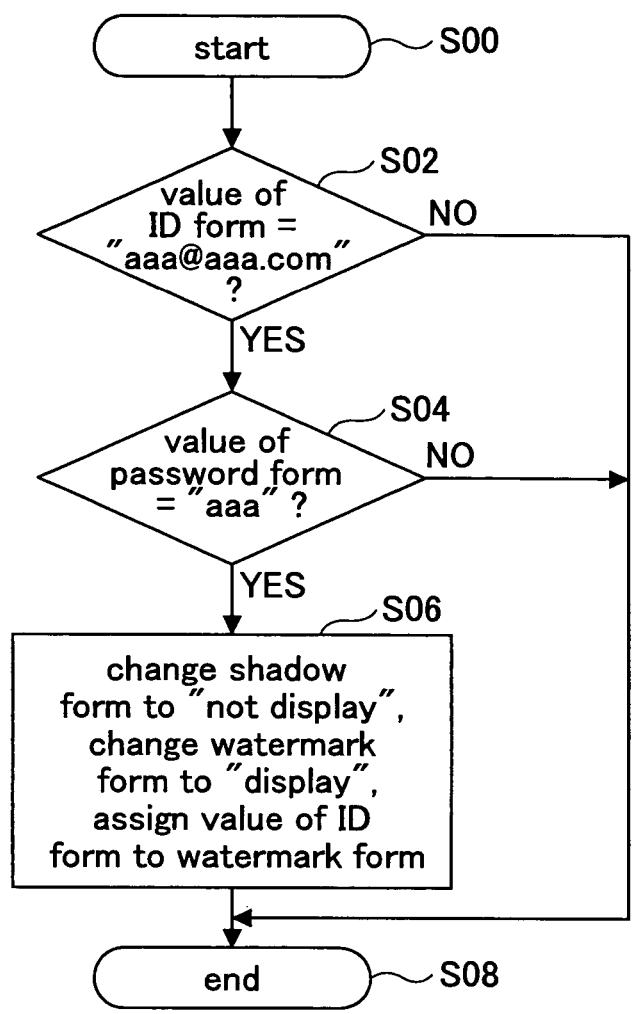

ID :aaa@aaa.com
Pwd : "aaa"

ELECTRONIC DOCUMENT HAVING AUTHENTICATION FUNCTION

BACKGROUND

1. Technical Field

This disclosure relates to an electronic document.

2. Description of the Related Art

Electronic documents, such as PDF documents and Word (registered trade mark) documents, are distributed through various networks to transmit information. Depending on the information content, it is desirable to maintain confidentiality or to avoid leakage (unauthorized disclosure) of some electronic documents.

In order to meet this requirement, in the related art, a password is provided for reading an electronic document, thereby preventing unauthorized reading. This is called "document reading protection function". However, this function is still not enough.

FIG. 12A is a block diagram schematically illustrating an example of a network in the related art for distributing electronic documents having the document reading protection function.

As shown in FIG. 12A, from a transmission source, an electronic document 2, distribution destinations of which are not specified, is distributed over the unspecified distribution destinations, such as a company A, a company B, and others. Here, assume a third party company C is able to obtain the electronic document 2 from the company A or the company B; however, since there is no record in the transmission source indicating the electronic document 2 has been sent to the company C, it is not clear whether the company C has obtained the electronic document 2. In addition, even when it is known that the company C has obtained the electronic document 2, it difficult to determine where the company C obtained the electronic document 2. Similarly, when another competitive company obtains the electronic document 2, it difficult to determine where the other competitive company obtained the electronic document 2 among the company A, the company B, the company C, and other third parties.

FIG. 12B is a block diagram schematically illustrating an example of a modified network in the related art to overcome the above problem.

In this example, from the transmission source, the electronic document 2, distribution destinations of which are specified, is created for and distributed to each of the specified distribution destinations. For example, in a document having a specified distribution destination, a watermark specific to a distribution destination is printed; alternatively, a password is provided for a specific distribution destination. With such a document having a specified distribution destination, there is a consensus that the company A, which is a distribution destination, does not distribute the document to a third party, such as the company C. This rule constrains the distribution destinations. As a result, the company C has to request the transmission source for distribution of the document. Receiving the request from the company C, and when the transmission source decides to distribute the document to the company C, the transmission source creates the document specific to the company C.

In the example shown in FIG. 12B, since the electronic document has to be created for each of the distribution destinations on the side of the transmission source, the workload of document creation on the side of the transmission source is high. In addition, when there is a new distribution destination, for example, when the company C requests to obtain the document, it takes quite a long time before the company C can obtain the document. Further, when a competitive company illegally obtains the document, although it is possible to determine from where the competitive company obtained the document, the competitive company cam easily read contents of the document.

For example, Japanese Laid Open Patent Application No. 2005-141746 discloses a technique of security authentication in a server through a network, in which the authentication is performed by software.

Japanese Laid Open Patent Application No. 2003-6028 discloses a technique of authenticating an ID and a password by software, in which a document is scrambled (encrypted).

Japanese Laid Open Patent Application No. 2001-256190 discloses a technique of performing authentication of a server by email, in which authentication of an ID and a password is performed by software.

SUMMARY

In a preferred embodiment described in this disclosure, there is provided an electronic document able to maintain confidentiality and prevent leakage of contents of the electronic document.

According to a first aspect, there is provided an electronic document displayed cm a display device of a computer., the electronic document driving the computer to execute functions of:

a setting unit that provides a verification data input field on a predetermined page of a document opened in response to an instruction input from an input unit for opening the document;

a determination unit that determines whether verification data input in the verification data input field satisfies predetermined conditions; and a partially-displaying unit that displays a predetermined portion of the document on the display device when the determination unit determines the verification data satisfies the predetermined conditions.

According to a second aspect, there is provided an electronic document displayed on a display device of a computer, said electronic document driving the computer to execute functions of:

a setting unit that provides a verification data input field on a predetermined page of a document opened and displayed in response to an instruction input from an input unit for opening the document, said verification data input field including a first data input field for inputting a first data item, and a second data input field for inputting a second data item;

a sustaining unit that combines plural of the first data items with the second data items respectively corresponding to the first data items and sustains the plural combinations in advance;

a determination unit that determines whether the first data item and the second data item respectively input in the first data input field and the second data input field are in agreement with one of the combinations; and an object setting unit that, when the determination unit determines the first data item and the second data item respectively input in the first data input field and the second data input field are in agreement with one of the combinations, performs at least one of an operation of not displaying a first object in which a content of the document is shielded, an operation of displaying a second object which includes the content of the document, and an operation of loading the input first data item into a third object able to display the first data item, and displaying the third object.

According to a third aspect, there is provided an electronic document displayed on a display device of a computer, said electronic document driving the computer to execute functions of:

a setting unit that provides a verification data input field on a predetermined page of a document input from an input unit according to an instruction of opening the document, said verification data input field including a first data input field for inputting a first data item, and a second data input field for inputting a second data item;

a sustaining unit that sustains a program in advance, said program automatically generating the second data from the input first data item;

a determination unit that determines whether the corresponding second data automatically generated by using the program from the first input data item input to the first data input field is in agreement with the second data item input to the second data input field; and an object setting unit that, when the determination unit determines the second data item automatically generated by using the program from the first input data item input to the first data input field is in agreement with the second data item input to the second data input field, performs at least one of an operation of not displaying a first object with content of the document being shielded, an operation of displaying a second object including the content of the document, and an operation of loading the input first data item into a third object enabled to display the first data item, and displaying the third object.

As an embodiment, the object setting unit may display the third object on all pages or some pages.

As an embodiment, the electronic document may further drive the computer to execute functions of a storage-time object setting unit that sets display attributes of the first object in a display state when the document is stored.

As an embodiment, the storage-time object setting unit sets display attributes of the second object in a non-displaying state.

As an embodiment, the electronic document may further drive the computer to execute functions of a storage-time object setting unit that sets display attributes of the first object in a display state when the document is stored.

As an embodiment, the electronic document may further drive the computer to execute functions of a check unit that checks the form of the first data item input in the first data input field, and excludes the first data item not satisfying predetermined conditions.

As an embodiment, the electronic document may further drive the computer to execute functions of a transmission source display unit that displays addresses of transmission sources for management of transmission of documents even when verification of the verification data is not made.

As an embodiment, when at least one of the first object, the second object, and the third object includes a plurality of objects, the plural objects are assigned the same object name in a built-in program.

As an embodiment, the electronic document may further drive the computer to execute functions of a status display unit that determines an input status of the first data input field, the second data input field, or the third data input field, and displays an object indicating the determined input status.

As an embodiment, the electronic document may further drive the computer to execute functions of a second object setting unit that, when date and time data given by the computer do not satisfy predetermined conditions, does not set the first object in a non-display state, and does not set the second object and the third object in display states.

As an embodiment, the program may use date and time data given by the computer as elements in a calculation process.

As an embodiment, when there are plural of the first objects, the object setting unit sets some objects of the plural first objects in the non-display state only when a predetermined first data item is input.

As an embodiment, when there are plural of the second objects, the object setting unit sets some objects of the plural second objects in the display state only when a predetermined first data item is input.

According to a fourth aspect, there is provided a method of representing an electronic document displayed on a display device of a computer, said method comprising the steps of:

obtaining verification data via a verification data input field provided on a predetermined page of a document opened and displayed in response to an instruction input from an input unit for opening the document; and determining whether the verification data satisfy predetermined conditions, and displaying a predetermined portion of the document on the display device when the verification data satisfy the predetermined conditions.

According to a fifth aspect, there is provided a method of representing an electronic document displayed on a display device of a computer, said method comprising the steps of:

sustaining a plurality of combinations of a plurality of first data sets and second data sets respectively corresponding to the first data sets in advance;

obtaining a first data set and a second data set via a verification data input field provided on a predetermined page of a document opened and displayed in response to an instruction input from in input unit for opening the document; and performing, when the first data set and the second data set are in agreement with one of the combinations, at least one of an operation of not displaying a first object in which content of the document is shielded, an operation of displaying a second object which includes the content of the document, and an operation of loading the input first data set into a third object able to display the first data set, and displaying the third object.

According to a sixth aspect, there is provided a method of representing an electronic document displayed on a display device of a computer, said method comprising the steps of:

sustaining a procedure for automatically generating a second data set from an input first data set in advance;

obtaining a first data set and a second data set via a verification data input field provided on a predetermined page of a document opened and displayed in response to an instruction input from an input unit for opening the document; and performing, when the first data set and the second data set are in agreement with one of the combinations, at least one of an operation of not displaying a first object in which content of the document is shielded, an operation of displaying a second object which includes the content of the document, and an operation of loading the input first data set into a third object able to display the first data set, and displaying the third object.

As an embodiment, the first object is not set in a non-display state, and the second object and the third object are not set in display states when date and time data given by the computer do not satisfy predetermined conditions.

As an embodiment, date and time data given by the computer are used as elements in a calculation process in the procedure.

According to a seventh aspect, there is provided an electronic document display device for displaying an electronic document and for inputting or outputting data of the electronic document, when the electronic document is displayed on the electronic document display device, the electronic document driving a computer to execute functions of:

a setting unit that provides a verification data input field on a predetermined page of a document opened and displayed in response to an instruction input from an input unit for opening the document, said verification data input field including a first data input field for inputting a first data set, and a second data input field for inputting a second data set;

a sustaining unit that combines a plurality of the first data set with the second data set respectively corresponding to the first data set and sustains the plural combinations in advance, and that sustains a program in advance, said program automatically generating the second data set from the input first data set;

a determination unit that determines whether the first data set and the second data set respectively input in the first data input field and the second data input field are in agreement with one of the combinations; and an object setting unit that, when the determination unit determines the first data set and the second data set respectively input in the first data input field and the second data input field are in agreement with one of the combinations, performs at least one of an operation of not displaying a first object in which content of the document is shielded, an operation of displaying a second object which includes the content of the document, and an operation of loading the input first data set into a third object able to display the first data set, and displaying the third object.

According to an eighth aspect, there is provided a storage medium wherein an electronic document is stored, when the electronic document is displayed on a display device of a computer, the electronic document driving a computer to execute functions of:

a setting unit that provides a verification data input field on a predetermined page of a document opened and displayed in response to an instruction input from an input unit for opening the document, said verification data input field including a first data input field for inputting a first data set, and a second data input field for inputting a second data set;

a sustaining unit that combines a plurality of the first data sets with the second data sets respectively corresponding to the first data sets and sustains the plural combinations in advance, and that sustains a program in advance, said program automatically generating the second data set from the input first data set;

a determination unit that determines whether the first data set and the second data set respectively input in the first data input field and the second data input field are in agreement with one of the combinations; and an object setting unit that, when the determination unit determines the first data set and the second data set respectively input in the first data input field and the second data input field are in agreement with one of the combinations, performs at least one of an operation of not displaying a first object in which content of the document is shielded, an operation of displaying a second object which includes the content of the document, and an operation of loading the input first data set into a third object able to display the first data, and displaying the third object.

Thus, by using the electronic document of the present invention, it is possible to maintain confidentiality appropriately and prevent leakage of contents of the electronic document, even when the electronic document is distributed through networks to a large number of users. In addition, the workload for preparing the distribution is low; further, even when leakage occurs, it is easy to determine the path of the leakage.

These and other aspects, features, and advantages will become more apparent from the following detailed description of preferred embodiments given with reference to the accompanying drawings.

BRIEF DESCRIPTION OF THE DRAWINGS

FIG. 2A is a block diagram illustrating a configuration of an electronic document according to a first embodiment of the present invention;

FIG. 2B is a block diagram illustrating a configuration of an electronic document display device according to the first embodiment of the present invention;

FIG. 4 is a flowchart showing the process executed by the code shown in TABLE 1;

DESCRIPTION OF THE PREFERRED EMBODIMENTS

Below, preferred embodiments of the present invention are explained with reference to the accompanying drawings.

First, a general idea of the present invention is described.

Figure 1:
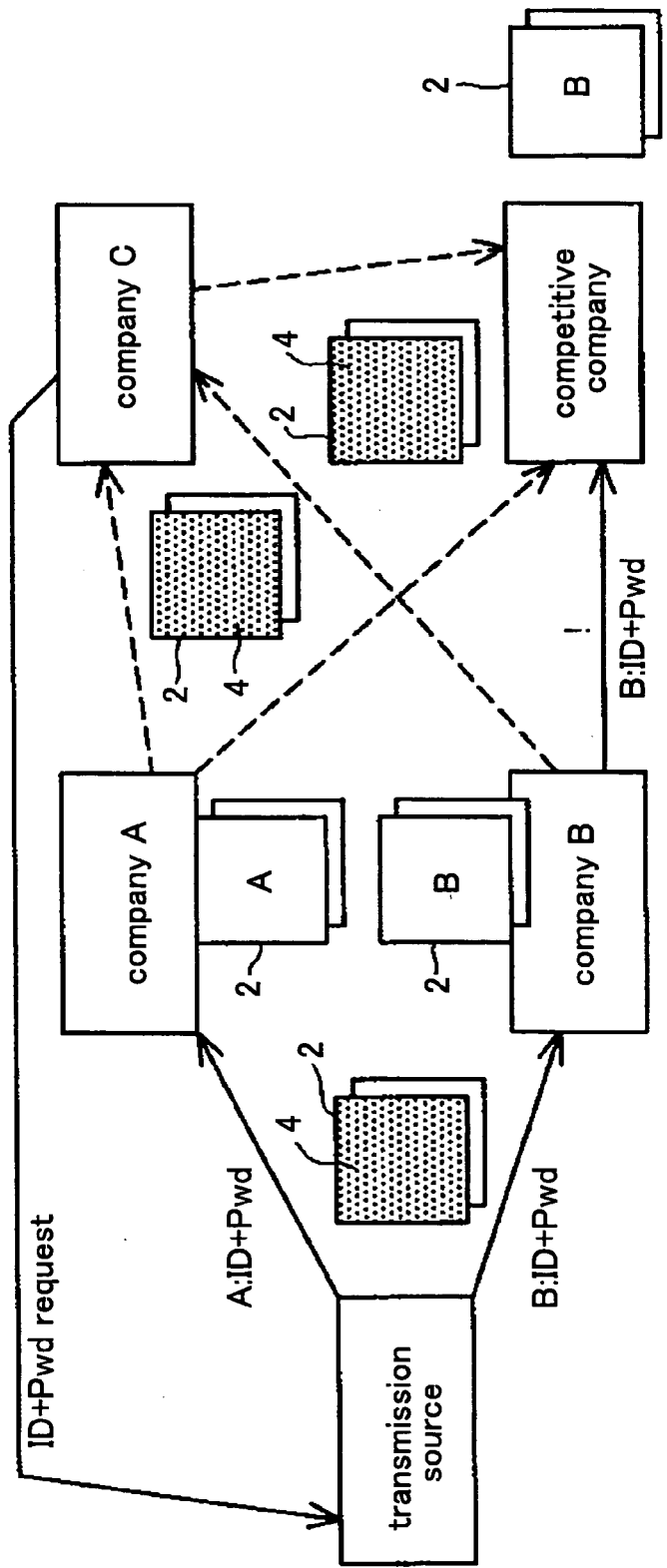
FIG. 1 is a block diagram schematically illustrating an example of a network for distributing electronic documents according to an embodiment of the present invention.

FIG. 1 is a block diagram schematically illustrating an example of a network for distributing electronic documents according to an embodiment of the present invention.

The electronic document according to an embodiment of the present invention is assigned separately an ID and a password, and if the ID and the password are not input, it is not allowed to read the electronic document. This rule has been programmed. When the ID and the password are input, the ID is displayed on the document. In this case, the ID of the opened document can be determined. On the side of the transmission source, there has been only one electronic document created, and the transmission source separately assigns an ID and a password for each distribution destination.

In the network shown in FIG. 1, a company A is assigned an ID and a password for an electronic document, and the company A inputs the ID and the password (indicated to be "Pwd" in FIG. 1) into the distributed electronic document; hence, the company A is able to read and confirm contents of the electronic document. In this case, the input ID is shown on all pages of the electronic document, and due to this, it can be determine that this electronic document is opened by using the ID of the company A.

A party, to whom the electronic document is distributed, may distribute the electronic document to a third party again. For example, the company A may distribute the electronic document to a company C. However, in the present invention, the company C is allowed to separately request the transmission source to issue an ID and a password specific to the company C, and with the ID and the password, the company C can read the electronic document. From the point of view of the transmission source, it is not necessary to create an electronic document for use of the company C, and it is sufficient to just issue the ID and the password for the company C.

Even when a competitive company has acquired the electronic document, if the competitive company does not have an ID and a password, it is not allowed to read the electronic document. Even when the competitive company acquires the ID and the password, it is possible to easily determine from where the ID and the password leaked out. For example, even if the competitive company acquires the ID and the password of a company B, since the ID of the company B is shown on all pages of the electronic document, it can be determined that it is from the company B that the ID and the password have leaked out.

First Embodiment

FIG. 2A is a block diagram illustrating a configuration of an electronic document according to a first embodiment of the present invention.

FIG. 2B is a block diagram illustrating a configuration of an electronic document display device according to the first embodiment of the present invention.

As shown in FIG. 2B, an electronic document display device 10 is obtained by installing electronic document display software in a common personal computer. Below, as an example, a PDF (Portable Document Format) document, which is developed by Adobe System Company, is used as the electronic document. Certainly, the present embodiment is not limited to this, and is applicable to other types of documents.

In addition, it is preferable that the electronic document of the present embodiment have script functions for objects, like the PDF document described below. For example, the PDF document has Java script functions.

The electronic document display device 10 shown in FIG. 2B includes a document manager 12, and the document manager 12 includes a document display 14, a Java script executor 16, and a form controller 18. The Java script executor 16 executes scripts for various objects included in the PDF document. The form controller 18 receives form control directions generated when the Java script executor 16 executes scripts, and controls various forms. Here, the "form" is one object in the PDF document.

As shown in FIG. 2A, a PDF document 20 includes document data 22. Briefly, the document data 22 include document contents 38, various forms 26, and storage-time executive Java scripts 24.

The document contents 38 are the actual contents of the document.

The forms 26 include a password form 28, an ID form 30, a contents form 32, a shadow form 34, and a watermark form 36. Since the forms 26 are objects, they include corresponding scripts.

In the electronic document of the related art, when opening the electronic document, first, input of a verification symbol, such as a password, is required, and the electronic document is not opened until a correct verification symbol, which is specific to the electronic document, is input. In the present embodiment, when a computer executes an operation of opening an electronic document, the document is opened, and on the beginning page, the ID form 30 and the password form 28 are attached displayed to urge input of the ID and the password. That is, in the present embodiment, input of a verification symbol is required immediately after the document is opened. Certainly, in the present embodiment, it is possible to further include the verification function immediately before the document is opened by using the verification symbol in the electronic document of the related art.

The ID form 30 is an editable text form for inputting an ID, and usually arranged on the first page of a document.

The password form 28 is an editable text form for inputting a password, and usually arranged on the first page of a document.

Figure 3A:
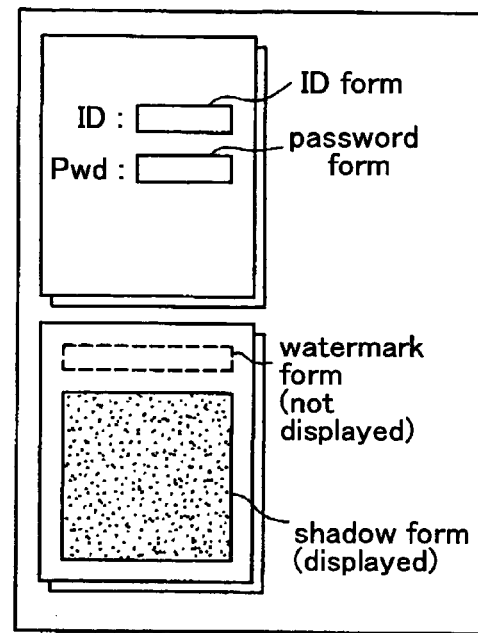
FIG. 3A and FIG. 3B are block diagrams illustrating various forms of the electronic document 20 according to the first embodiment of the present invention.
Figure 3B:
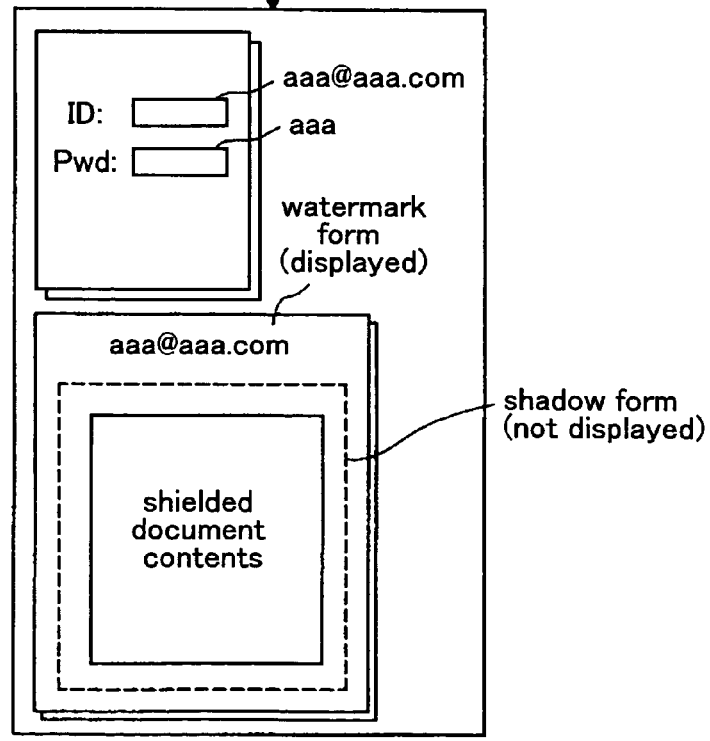

FIG. 3A and FIG. 3B are block diagrams illustrating various forms of the electronic document 20 according to the first embodiment of the present invention.

For example, the ID form 30 and the password form 28 are shown in FIG. 3A and FIG. 3B.

The shadow form 34 is a sheet-like non-editable opaque text form for covering part of or the whole of the contents of a page, and is displayed when a wrong password is input relative to an ID. The shadow form 34 is usually arranged on the second and each subsequent page of a document.

The watermark form 36 is a non-editable text form for processing and displaying the input ID, and is configured not to be displayed when a wrong password is input relative to a correct ID. The watermark form 36 is usually arranged on the second and each subsequent page of a document.

The contents form 32 is a non-editable text form for displaying the intrinsic contents of the document, and is configured not to be displayed when a wrong password is input relative to a correct ID. The contents form 32 is usually arranged on the second and the each subsequent page of a document.

In FIG. 3A, the shadow form 34 is in a display state, and in FIG. 3B, the shadow form 34 is in a non-display state.

Figure 6A:
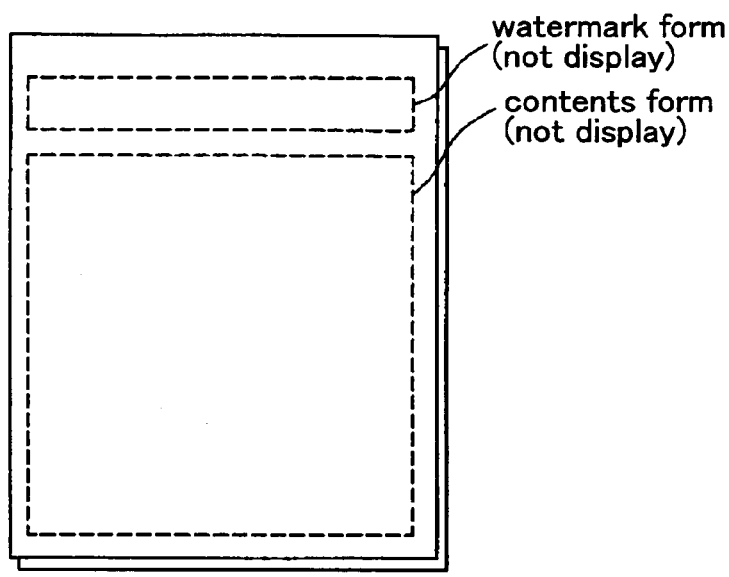
FIG. 6A and FIG. 6B are block diagrams illustrating the contents form 32 and the watermark form 36 of the electronic document 20 according to the first embodiment of the present invention.
Figure 6B:
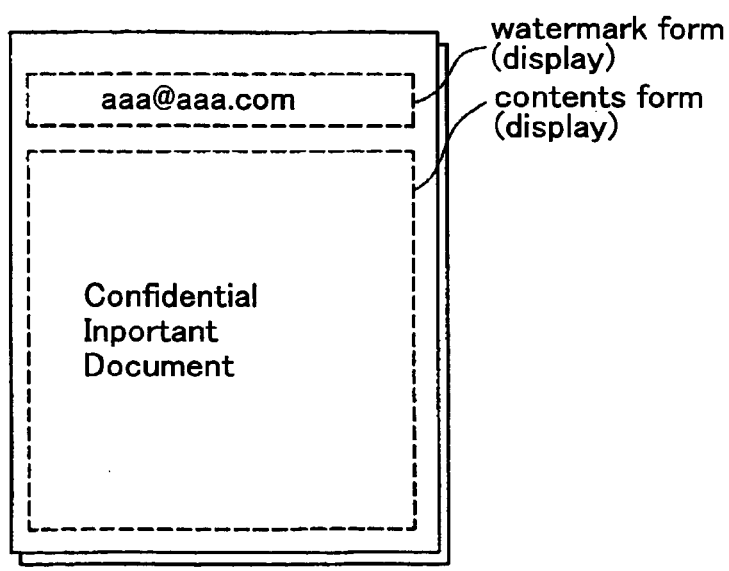

FIG. 6A and FIG. 6B are block diagrams illustrating the contents form 32 and the watermark form 36 of the electronic document 20 according to the first embodiment of the present invention.

In FIG. 6A, the contents form 32 and the watermark form 36 are in a non-display state. In FIG. 6B, the contents form 32 and the watermark form 36 are in a display state.

In the present embodiment, when an ID and a password are input to the ID form 30 and the password form 28 of a PDF document, respectively, a Java script program embedded in the PDF document is executed, and the input data of the ID form 30 and the password form 28 are compared to the ID and the password recorded in the PDF document.

For example, by executing the code shown in TABLE 1, when "aaa@aaa.com" is input into the ID form 30 as the ID, and "aaa" is input into the password form 28 as the password, respectively, it is determined that the input ID and password are in agreement with the ID and the password recorded in the PDF document. That is, when "aaa@aaa.com" is input as the ID, and "aaa" is input as the password, the shadow form 34 is in a non-display state, the watermark form 36 is in a display state, and in the watermark form 36, the input data of the ID form 30 is set in the watermark form 36.

TABLE 1

```
var h = this.getField("ID");
var f = this.getField("Shadow");
f.hidden = ((event.value == "aaa") &&
(h.value =="aaa@aaa.com"));
var g = this.getField("watermark");
g.hidden = ((event.value != "aaa") ||
(h.value !="aaa@aaa.com"));
g.value = h.value;
```

FIG. 4 is a flowchart showing the process executed by the code shown in TABLE 1.

As shown in FIG. 3B, when the correct ID and password (Pwd) are input, the shadow form 34 changes to the non-display state, and the watermark form 36 changes to the display state. The shielded contents of the document are disclosed after the shadow form 34 changes from the display state to the non-display state.

In FIG. 6B, it is shown that the contents form 32 and the watermark form 36 are in a display state.

The electronic document including the code shown in TABLE 1 can effectively function when the number of the IDs and passwords is fixed. In other words, when new IDs and passwords are issued, the code in TABLE 1 has to be modified. In addition, the size of the electronic document increases when the number of the IDs is increases.

Therefore, in the present embodiment, methods different from that shown in TABLE 1 and FIG. 4 may be used to authenticate whether a correct password corresponding to the input ID is input. For example, when an ID and a password are input, a Java script program embedded in the password form 28 in the document is executed, a value of a password is calculated from the contents of the ID form 30, the calculated password value is compared to the contents of the password form 28, and it is determined whether the calculated password value and the contents of the password form 28 are in agreement.

Figure 5:
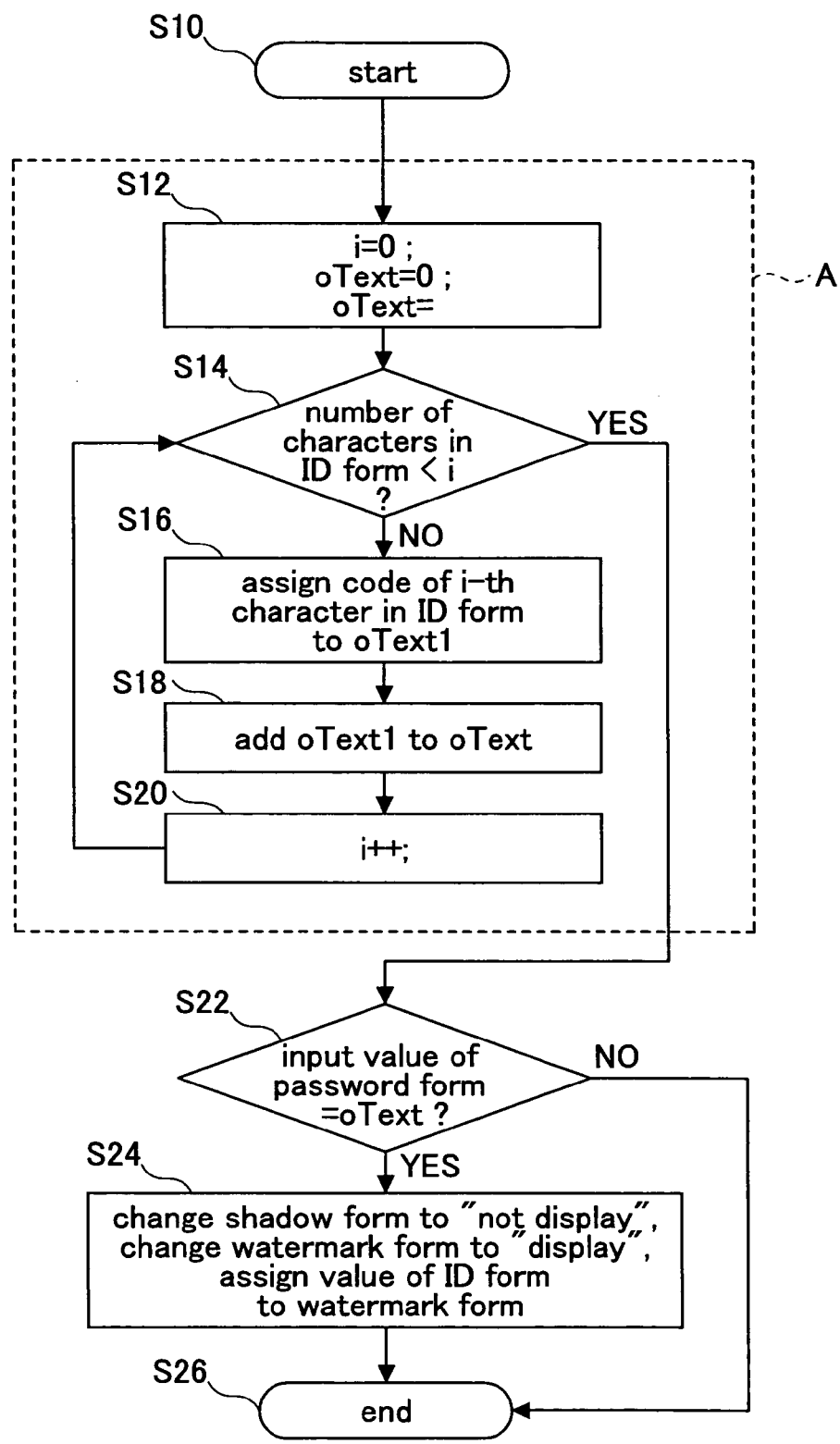
FIG. 5 is a flowchart showing the process of calculating the value of the password from the contents of the ID form 30, and determining whether the calculated password value and the contents of the password form 28 are in agreement with each other.

FIG. 5 is a flowchart showing the process of calculating the value of the password from the contents of the ID form 30, and determining whether the calculated password value and the contents of the password form 28 are in agreement.

In FIG. 5, it is assumed that the password value "oText" corresponds to a sum of numerical values of character codes of characters input in the ID form. TABLE 2 shows code for executing this process.

For example, according to the code in FIG. 2, when "aaa@aaa.com" is input into the ID form 30 as the ID, and "1011" is input into the password form 28 as the password, it is determined that a correct password corresponding to the input ID is input. When "bbb@bbb.com" is input into the ID form 30 as the ID, and "1017" is input into the password form 28 as the password, it is also determined that a correct password corresponding to the input ID is input. Thus, on the side of the transmission source of an electronic document, the password corresponding to the ID can be calculated based on the computation logic (the portion indicated by "A" in FIG. 5) of the Java script program embedded in the password form 28, and the password may be provided to a distribution destination separately. Of course, the computation logic of the Java script program embedded in the password form 28 is not limited to that shown in FIG. 5.

According to the flowchart shown in FIG. 5, namely, by using an electronic document including the code shown in TABLE 2 on the side of the transmission source of the electronic document, it is sufficient to monitor the distribution destination and the ID, a corresponding password of which has been provided to the distribution destination. For this reason, the burden on the transmission source is reduced. In other words, because of the scheme of calculating a password corresponding to an ID by using a formula identical to that embedded in the document, and providing the password to a distribution destination, it is not necessary to modify the PDF document or add new PDF documents, and the present method is also suitable for additional new IDs generated in the future. Namely, it is not necessary to monitor the passwords.

TABLE 2

```
var id = this.getField("ID");
var pw = this.getField("Password");
var hide = this.getField("Shadow");
var water = this.getField("watermark");
var oText = 0;
oVal = id.value;
pVal = pw.value;
for (i=0; i<oVal.length; i++) {
  oText1 = oVal.charCodeAt(i);
  oText = oText + oText1;
};
water.value = id.value;
water.hidden = ((pVal != oText) || (id.value ==""));
hide.hidden = ((pVal == oText) && (id.value !=""));
```

Below, the display state of the contents form 32, the non-display state of the shadow form 34, and the display state of the watermark form 36 are described.

When matching of the ID and password is confirmed, the shadow form 34 is set in the non-display state, as shown in step S06 in FIG. 4, and step 24 in FIG. 5. Due to this, the contents of all pages of the document shielded by the shadow form 34 are disclosed. For example, at the beginning time of execution of a program, code as shown in TABLE 3 is executed to confirm the state of the shadow form 34. When conditions set in the program are satisfied, a code as shown in TABLE 4 is executed to change the display attributes of the shadow form 34 covering the document to a value corresponding to the non-display state.

TABLE 3

```
var hide = this.getField("Shadow");
```

TABLE 4

```
hide.hidden = ((pVal == oText) && (id.value !=""));
```

Further, when matching of the ID and password is confirmed, the contents form 32 including the watermark form 36 and the document contents is displayed on all pages, as shown in step S06 in FIG. 4, and step S24 in FIG. 5. Due to this, it is possible to display the watermark form 36 and the document contents only when matching of the ID and password is confirmed. For example, at the beginning time of execution of a program, code as shown in TABLE 5 is executed to confirm the states of the ID form 30, the contents form 32, and the watermark form 36. When conditions set in the program are satisfied, code as shown in TABLE 6 is executed to set the contents of the ID form 30 to the watermark form 36; further, code as shown in TABLE 7 is executed to change the display attributes of the contents form 32 including the document contents and the watermark form 36 including the ID to the display state.

TABLE 5

```
var id = this.getField("ID");
var water = this.getField("watermark");
var c = this.getField("Contents");
```

TABLE 6

```
water.value = id.value;
```

TABLE 7

```
water.hidden = ((pVal != oText) || (id.value ==""));
c.hidden = ((pVal != oText) || (id.value ==""));
```

The watermark form 36 may be displayed on all pages. Due to this, even when some pages are leaked out, the party who leaked the document is very clear.

In the electronic document of the present invention, plural shadow forms are necessary to cover the document contents on plural pages of the PDF document. Similarly, plural watermark forms and contents forms are required. In this case, if different names are used for these identical forms, one has to set or change settings of attributes of plural forms; due to this, the length of the script codes increases.

In order to avoid this problem, it is preferable that the same name be used for the same type forms.

Second Embodiment

Figure 7:
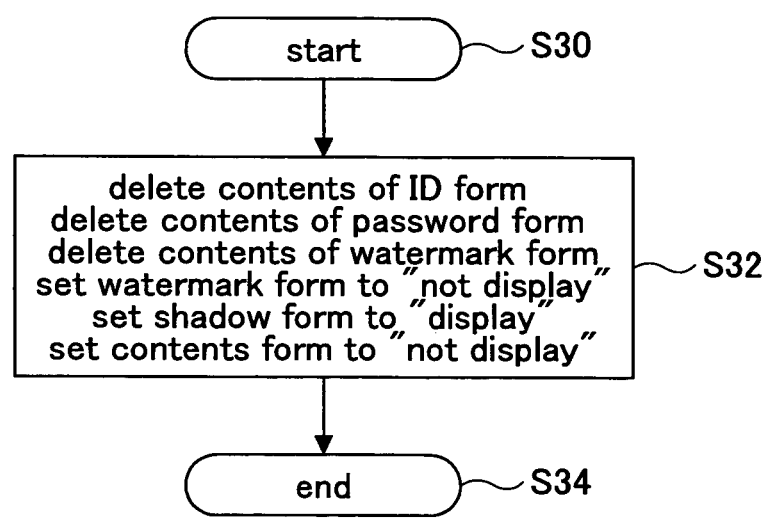
FIG. 7 is a flow chart showing the process of a Java script executed when storing an electronic document according to a second embodiment of the present invention.

FIG. 7 is a flowchart showing the process of a Java script executed when storing an electronic document according to a second embodiment of the present invention.

The electronic document of the second embodiment is basically the same as the electronic document of the first embodiment, and includes the same constituent elements as the electronic document of the first embodiment, and the same reference numbers are assigned to the same elements.

In the electronic document of the first embodiment, in order to input an ID and a password when opening the electronic document, the ID form 30 and the password form 28 are filled up with data immediately before storing the document. In addition, contents of the ID form 30 are assigned to the watermark form 36, and the watermark form 36 is displayed, the shadow form 34 is not displayed, and the contents form 32 is displayed. That is, the document is stored while viewing the contents of the document is allowed, and the preset ID is specified. This causes security problems. For example, when the document is opened next time, the ID and the password have been written down, thereby, viewing the contents of the document is allowed without any authentication.

To solve this problem, it is preferable to execute a storage-time executive Java script to reset the document to its initial state when storing the document. The flow chart in FIG. 7 shows the process of the storage-time executive Java script.

Below, TABLE 8 shows an example of a script code for setting the ID form 30 to null and deleting contents of the ID form 30; TABLE 9 shows an example of a script code for setting the watermark form 36 to null and resetting the watermark form 36 to the non-display state, and setting the contents form 32 and resetting the contents form 32 to the non-display state; TABLE 10 shows an example of a script code for resetting the shadow form 34 to the display state. It should be noted that a script code for setting the password form 28 to null and deleting contents of the password form 28 is basically the same as that shown in TABLE 8.

TABLE 8

```
var id = this.getField("ID");
id.value = "";
```

TABLE 9

```
var water = this.getField("watermark");
var c = this.getField("Contents");
water.value = "";
water.hidden = 1;
c.hidden = 1;
```

TABLE 10

```
var hide = this.getField("Shadow");
hide.hidden = 1;
```

Third Embodiment

The electronic document of the third embodiment is basically the same as the electronic document of the first embodiment, and includes the same constituent elements as the electronic document of the first embodiment, and the same reference numbers are assigned to the same elements.

In an electronic document using the computation logic shown in the portion indicated by "A" in FIG. 5, a smaller number of characters of the ID, the calculated value of the password is simpler. That is, if the ID is short, when it is input for many times, the mathematical relation used to calculate the password from the ID may be analyzed.

To solve this problem, it is preferable to require that the number of characters input into the ID form 30 be greater than a preset number. For example, when the code shown in TABLE 11 is executed, it is required that the number of characters input into the ID form 30 be greater than 8.

TABLE 11

```
var id = this.getField("ID");
oVal = id.value;
if (oVal.length < 8)
{
id.value = "";
}
```

In addition, it may be required that the characters of the ID be regular ones. For example, when the code shown in TABLE 11 is executed, it is possible to limit the ID input into the ID form 30 to a form of an electronic mail address.

TABLE 12

```
var id = this.getField("ID");
oVal = id.value;
if (!oVal.match(/.+@.+¥.com$|.+@.+¥.com¥...$|.+@.+¥.co¥...$/))
{
id.value = "";
}
```

In addition, an address for separately acquiring the password corresponding to the ID may be displayed. For example, if the address for acquiring the password, such as a telephone number, a postal address, or an electronic mail address, is presented in a portion not shielded by the shadow form 34, especially, a portion near the ID form 30 and the password form 28, a user can easily be aware of the place to acquire the password. In addition, when it is possible to make an on-line request to acquire a password through the Internet, the link to the URL of the place to acquire the password can be located at the same position.

Fourth Embodiment

Figure 8A:
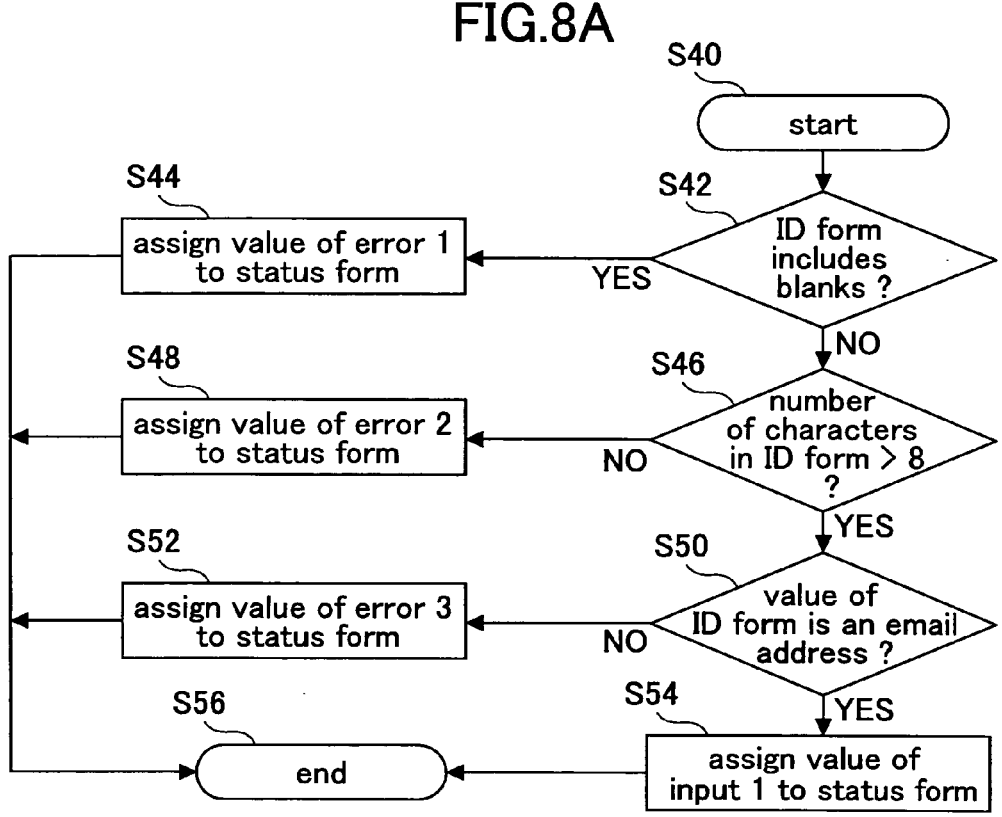
FIG. 8A is a flow chart illustrating part of the process of an ID form Java script of an electronic document according to a fourth embodiment of the present invention.

FIG. 8A is a flow chart illustrating part of the process of an ID form Java script of an electronic document according to a fourth embodiment of the present invention.

Figure 8B:
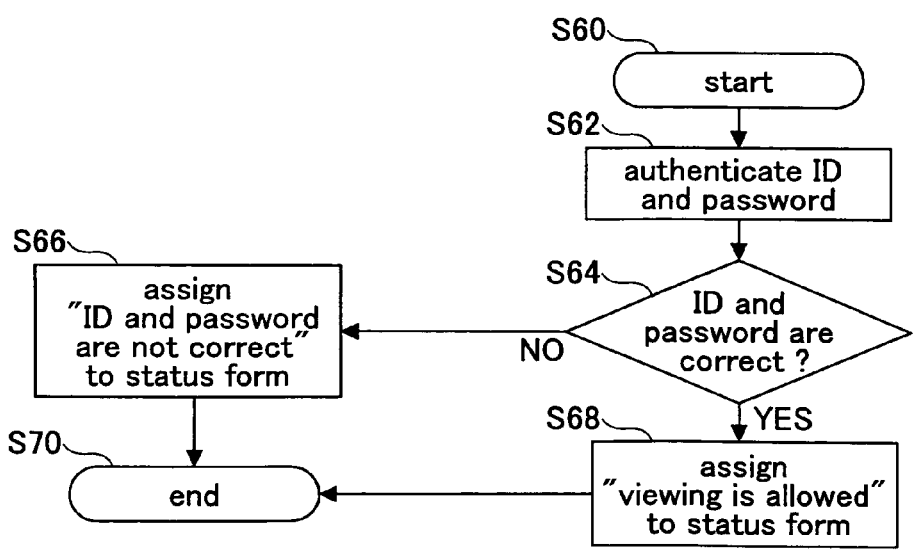
FIG. 8B is a flow chart illustrating part of the process of a password form Java script of the electronic document of the fourth embodiment of the present invention.

FIG. 8B is a flow chart illustrating part of the process of a password form Java script of the electronic document of the fourth embodiment of the present invention.

The electronic document of the fourth embodiment is basically the same as the electronic document of the first embodiment, and includes the same constituent elements as the electronic document of the first embodiment, and the same reference numbers are assigned to the same elements.

The electronic document of the fourth embodiment includes a status form. The status form is located near the ID form 30 and the password form 28 to show the input status of the ID form 30 and the password form 28.

As shown in the flowchart in FIG. 8A, in step S42, it is determined whether the ID form 30 includes blanks.

In step S44, when the ID form 30 includes blanks, an error message (referred to as "error 1") "there is(are) blank(s) in ID" is assigned to the status form.

In step S46, when the ID form 30 does not include blanks, it is determined whether the number of characters in the ID form 30 is greater than 8.

In step S48, if the number of characters in the ID form 30 is less than 8, an error message (referred to as "error 2") "ID must have 8 or more characters" is assigned to the status form.

In step S50, when the number of characters in the ID form 30 is greater than 8, it is determined whether the content of the ID form 30 is an email address.

In step S52, if the content of the ID form 30 is not an email address, an error message (referred to as "error 3") "ID must be an email address" is assigned to the status form.

In step S54, after confirming the ID is in correct form in step S42, S46, and S50, an input message (referred to as "input 1") "please input your password" is assigned to the status form.

Further, as shown in the flowchart in FIG. 8B, in step S62, authentication process is performed.

Next, in step S64, it is determined whether the input ID and password are correct.

In step S66, when the input ID and password are not correct, a message "ID and password are not correct" is assigned to the status form.

In step S68, when the input ID and password are correct, a message "viewing of the document is allowed" is assigned to the status form. S54 assign value of status form to input 1

Fifth Embodiment

Figure 9:
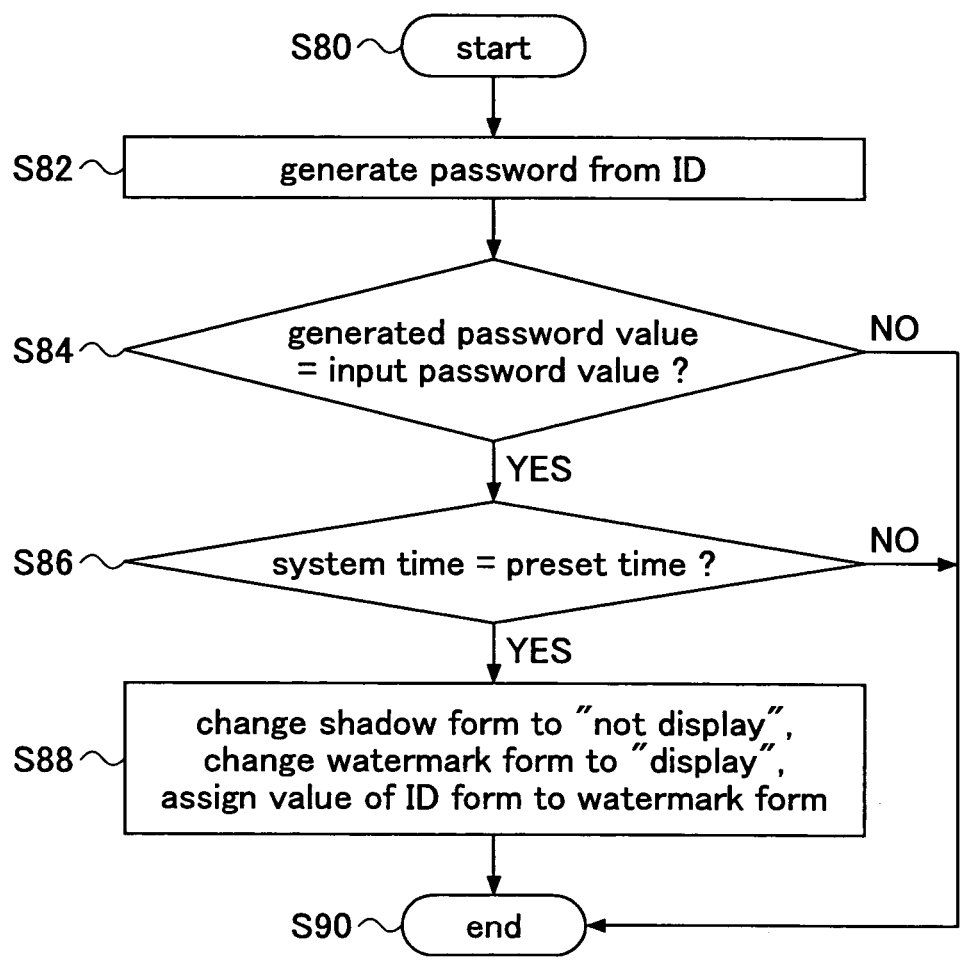
FIG. 9 is a flow chart illustrating part of the process of a password form Java script of the electronic document according to a fifth embodiment of the present invention.

FIG. 9 is a flowchart illustrating part of the process of a password form Java script of the electronic document according to a fifth embodiment of the present invention.

The electronic document of the fifth embodiment is basically the same as the electronic document of the first embodiment, and includes the same constituent elements as the electronic document of the first embodiment, and the same reference numbers are assigned to the same elements.

In the present embodiment, after verifying an ID and a password, when opening a document, the system date and time are compared to date and time preset in a script, and when the system date and time are not in agreement with the date and time preset in the script, the authentication is abandoned. In doing so, it is possible to prevent viewing the contents of a document.

Specifically, as shown in the flowchart in FIG. 9, in step S86, it is confirmed whether the present system date and time are in agreement with the date and time preset in the script.

For example, TABLE 13 shows code executed at the time when inputting data into the password form, which prevents viewing of documents starting in the year of 2007.

According to the present embodiment, for example, when a new version of a document is released in or before the year of 2006, it is possible to prevent viewing of the old version of the document starting in 2007.

In addition, by combining the present embodiment with the fourth embodiment, it is possible to present a message in the status form to prompt the user to acquire the new version of the document.

TABLE 13

```
var id = this.getField("ID");
var pw = this.getField("Password");
var hide = this.getField("Shadow");
var water = this.getField("watermark");
myD = new Date( );
myYear4 = myD.getYear( );
myYear = (myYear4 < 2000) ? myYear4+1900 : myYear4;
var oText = 0;
oVal = id.value;
pVal = pw.value;
for (i=0; i<oVal.length; i++) {
  oText1 = oVal.charCodeAt(i);
  oText = oText + oText1;
};
if (myYear < 2006) {
  water.value = id.value;
  water.hidden = ((pVal != oText) || (id.value ==""));
  hide.hidden = ((pVal == oText) && (id.value !=""));
}
else { };
```

Sixth Embodiment

Figure 10:
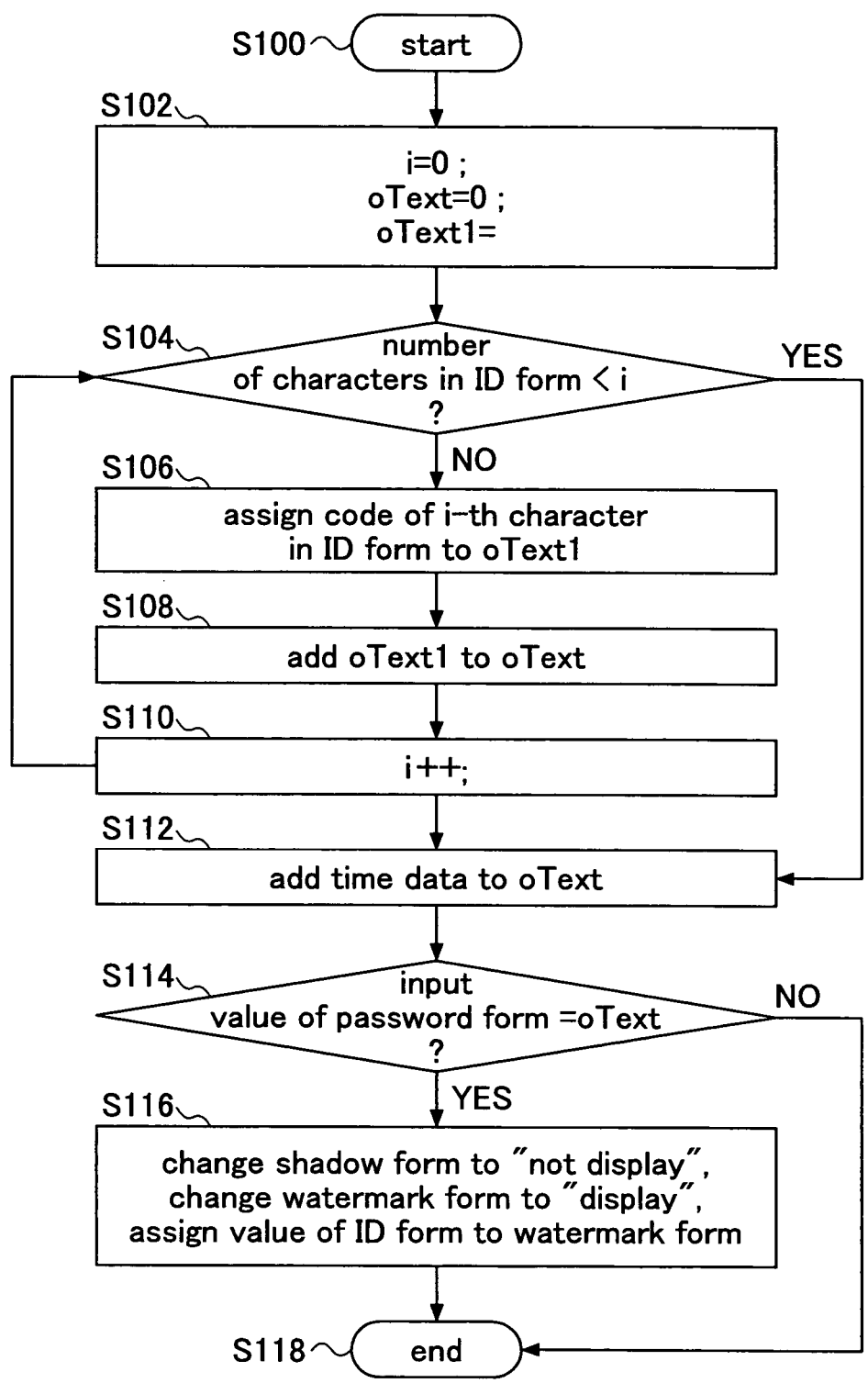
FIG. 10 is a flow chart illustrating part of the process of a password form Java script of the electronic document according to a sixth embodiment of the present invention.

FIG. 10 is a flowchart illustrating part of the process of a password form Java script of the electronic document according to a sixth embodiment of the present invention.

The electronic document of the sixth embodiment is basically the same as the electronic document of the first embodiment, and includes the same constituent elements as the electronic document of the first embodiment, and the same reference numbers are assigned to the same elements.

In the present embodiment, the method of generating the value of the password from the ID is combined with verification of the system date and time when opening the document. Due to this, since the value of the password changes along with the time and date, it is possible to set a time limit of the password.

Specifically, as shown in the flowchart in FIG. 10, in step S112, the present system time and date data are added to the value of the password.

According to the code shown in TABLE 14, relative to an ID "aaa@aaa.com", the password in the year of 2005 is "3026", but the password in the year of 2006 is "3027". Thus, one cannot view a document in 2006 by using the password of the year of 2005.

In addition, by combining the present embodiment with the fourth embodiment, it is possible to present a message in the status form to prompt the user to acquire the new password of the next year.

TABLE 14

```
var id = this.getField("ID");
var pw = this.getField("Password");
var hide = this.getField("Shadow");
var water = this.getField("watermark");
myD = new Date( );
myYear4 = myD.getYear( );
myYear = (myYear4 < 2000) ? myYear4+1900 : myYear4;
var oText = 0;
oVal = id.value;
pVal = pw.value;
for (i=0; i<oVal.length; i++) {
oText1 = oVal.charCodeAt(i);
oText = oText + oText1;
};
oText = oText + myYear;
water.value = id.value;
water.hidden = ((pVal != oText) || (id.value ==""));
hide.hidden = ((pVal == oText) && (id.value !=""));
```

Seventh Embodiment

Figure 11A:
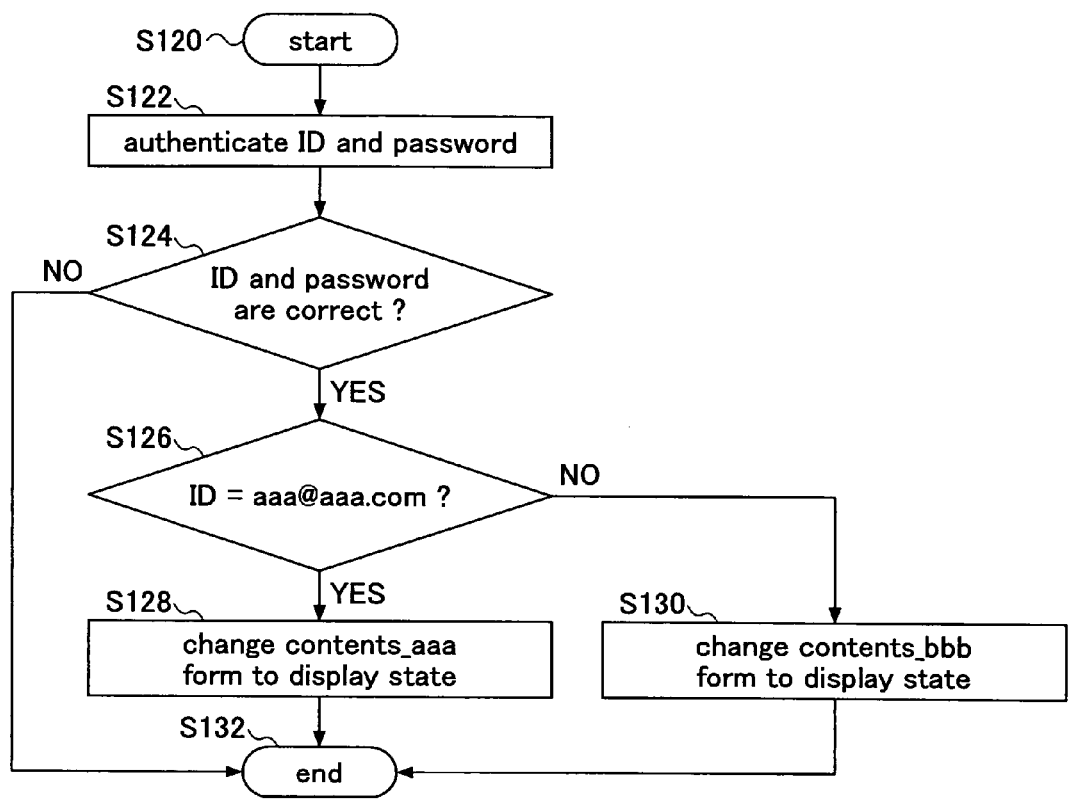
FIG. 11A is a flow chart illustrating part of the process of a password form Java script of the electronic document according to a sixth embodiment of the present invention.

FIG. 11A is a flow chart illustrating part of the process of a password form Java script of the electronic document according to a sixth embodiment of the present invention.

Figure 11B:
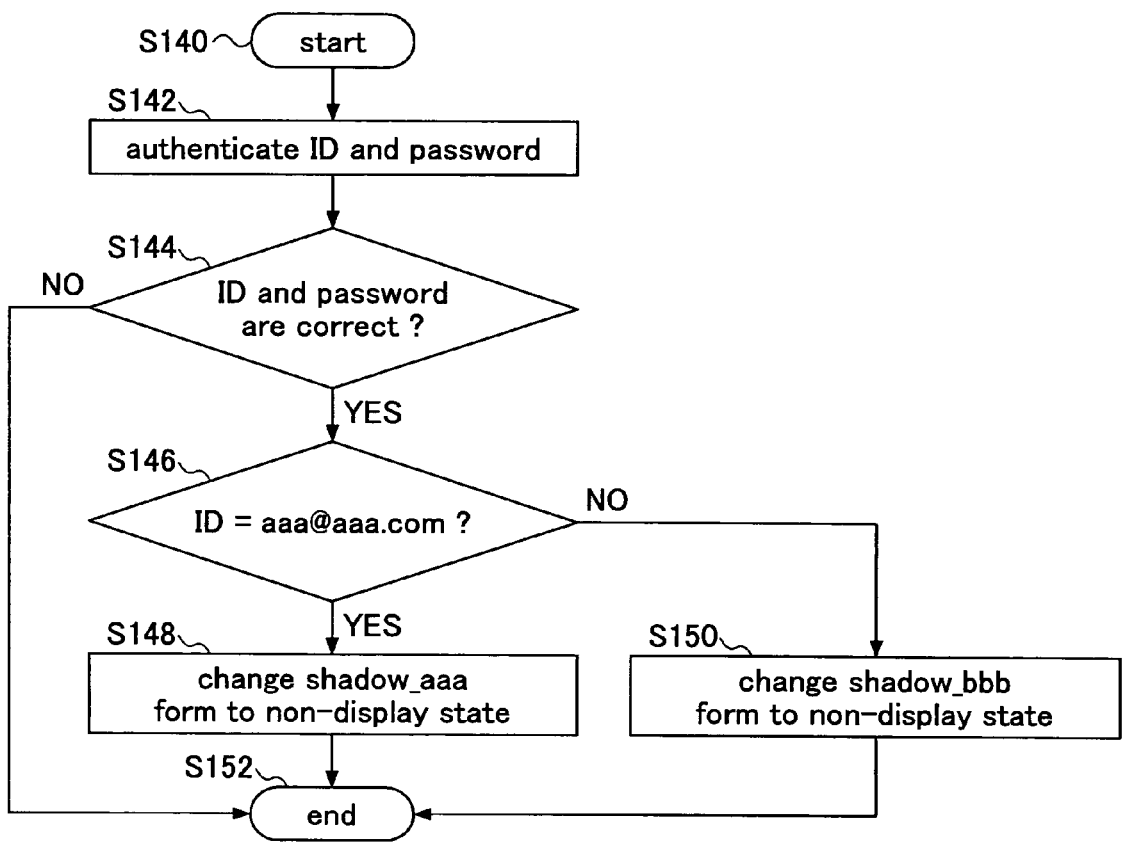
FIG. 11B is a flow chart illustrating part of the process of another password form Java script of the electronic document according to the sixth embodiment of the present invention.
Figure 12A:
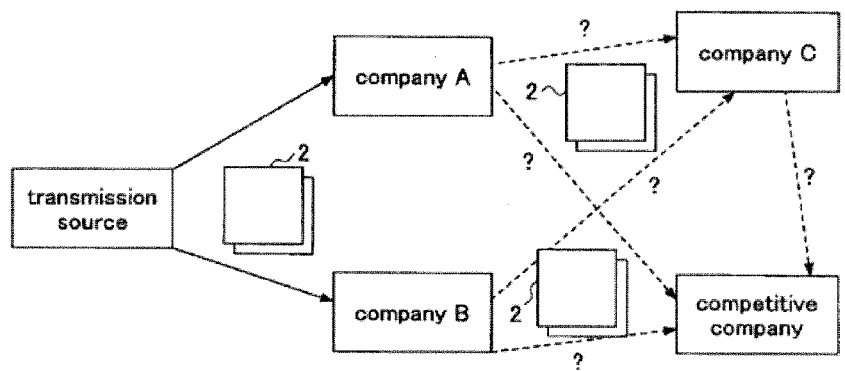
FIG. 12A is a block diagram schematically illustrating an example of a network in the related art for distributing electronic documents having the document reading protection function.
Figure 12B:
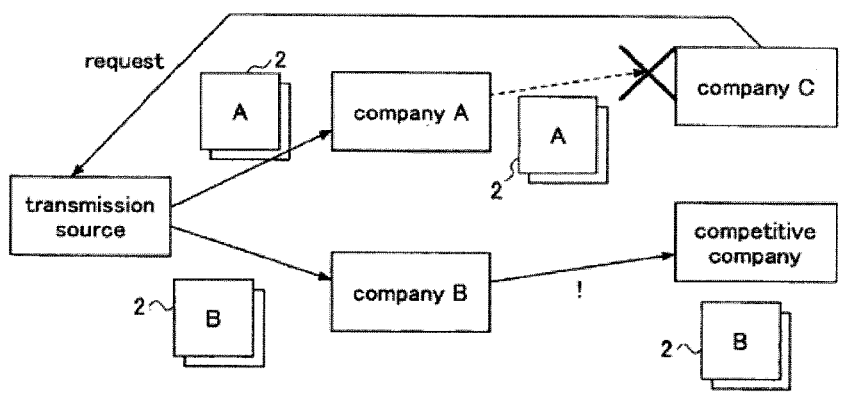
FIG. 12B is a block diagram schematically illustrating an example of a modified network in the related art to overcome the above problem.

FIG. 11B is a flow chart illustrating part of the process of another password form Java script of the electronic document according to the sixth embodiment of the present invention.

The electronic document of the seventh embodiment is basically the same as the electronic document of the first embodiment, and includes the same constituent elements as the electronic document of the first embodiment, and the same reference numbers are assigned to the same elements.

In the present embodiment, the contents to be displayed change along with the input ID. Specifically, after authenticating the ID and the password, depending on conditions concerning the ID, objects are selectively displayed.

As shown in step 126, step 128, and step 130 in the flowchart in FIG. 11A, when the ID is "aaa@aaa.com", a contents form "contents_aaa" is displayed, and when ID is not "aaa@aaa.com", a contents form "contents_bbb" is displayed.

For example, it is possible to set that the contents "aaa" of a document are displayed only when ID is "aaa@aaa.com", and the contents "bbb" of a document are displayed when ID is not "aaa@aaa.com".

TABLE 15 shows code executed when inputting data into the password form to realize the above process.

In the present embodiment, it is also possible to control displaying or not displaying of contents of the shadow form 34 depending on the input ID.

TABLE 15

```
var id = this.getField("ID");
var pw = this.getField("Password");
var water = this.getField("watermark");
```

TABLE 15-continued

```
var ca = this.getField("Contents_aaa");
var cb = this.getField("Contents_bbb");
var oText = 0;
oVal = id.value;
pVal = pw.value;
for (i=0; i<oVal.length; i++) {
oText1 = oVal.charCodeAt(i);
oText = oText + oText1;};
water.value = id.value;
water.hidden = ((pVal != oText) || (id.value ==""));
if (oVal = "aaa@aaa.com")
{ca.hidden = ((pVal != oText) || (id.value ==""));}
else
{cb.hidden = ((pVal != oText) || (id.value ==""));};
```

As shown in step S146, S148, and S150 in the flowchart in FIG. 11B, when ID is "aaa@aaa.com", only a shadow form "shadow_aaa" is not displayed, and when ID is not "aaa@aaa.com", only a shadow form "shadow_bbb" is displayed.

For example, it is possible to set that, when the ID is "aaa@aaa.com", the shadow form "shadow_aaa" is not displayed so as to disclose specified contents of a document, and when the ID is not "aaa@aaa.com", the shadow form "shadow_bbb" is not displayed so as to disclose other portions of the document.

TABLE 16 shows a code executed when inputting data into the password form to realize the above process.

TABLE 16

```
var id = this.getField("ID");
var pw = this.getField("Password");
var hidea = this.getField("Shadow_aaa");
var hideb = this.getField("Shadow_bbb");
var water = this.getField("watermark");
var oText = 0;
oVal = id.value;
pVal = pw.value;
for (i=0; i<oVal.length; i++) {
oText1 = oVal.charCodeAt(i);
oText = oText + oText1;};
water.value = id.value;
water.hidden = ((pVal != oText) || (id.value ==""));
if (oVal = "aaa@aaa.com")
{hidea.hidden = ((pVal == oText) && (id.value !=""));}
else
{hideb.hidden = ((pVal == oText) && (id.value !=""));};
```

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2005-226826 filed on Aug. 4, 2005, the entire contents of which are hereby incorporated by reference.

What is claimed is:

1. An electronic document displayed on a display device of a computer, said electronic document including instructions embodied in a non-transitory computer-readable medium which are executable by the computer to drive the computer to execute functions of:

a setting unit that provides a first input field and a second input field for prompting a user to input verification data to unshield confidential contents in the electronic document, the verification data including user identification, entered in the first input field, and having been provided from a provider of the electronic document to the user, the setting unit calculating a value of a password based on contents of the first input field;

a determination unit that determines whether the verification data satisfy predetermined conditions and whether the calculated password value is in agreement with contents of the second input field; and a displaying unit that displays the electronic document with the unshielded confidential contents on the display device when the determination unit determines that the verification data satisfy the predetermined conditions, wherein the displaying unit displays the inputted user identification embedded into the electronic document on the display device, and the user is not permitted to edit the user identification embedded into the electronic document, and wherein the calculated password value is a sum of numerical values of character codes of characters entered in the first input field as the user identification.

2. An electronic document displayed on a display device of a computer, said electronic document including instructions embodied in a non-transitory computer-readable medium which are executable by the computer to drive the computer to execute functions of:

a setting unit that provides a first input field and a second input field for prompting a user to input verification data to unshield confidential contents in the electronic document, the verification data including user identification, entered in the first input field, and having been provided from a provider of the electronic document to the user, the setting unit calculating a value of a password based on contents of the first input field, said setting unit further providing a first data input field for inputting a first data set, and a second data input field for inputting a second data set;

a sustaining unit that combines a plurality of the first data sets with the second data sets respectively corresponding to the first data sets and sustains the plural combinations in advance;

a determination unit that determines whether the first data set and the second data set respectively input in the first data input field and the second data input field are in agreement with one of the combinations, and that determines whether the verification data satisfy predetermined conditions and whether the calculated password value is in agreement with contents of the second input field;

a displaying unit that displays the electronic document with the unshielded confidential contents on the display device when the determination unit determines that the verification data satisfy the predetermined conditions; and an object setting unit that, when the determination unit determines the first data set and the second data set respectively input in the first data input field and the second data input field are in agreement with one of the combinations, causes to be performed at least one of not displaying a first object in which a content of the document is shielded, displaying a second object which includes the content of the document, and loading the input first data set in to a third object able to display the first data set, and displaying the third object, wherein the displaying unit displays the inputted user identification embedded into the electronic document on the display device, and the user is not permitted to edit the user identification embedded into the electronic document, and wherein the calculated password value is a sum of numerical values of character codes of characters entered in the first input field as the user identification.

3. The electronic document as claimed in claim 2, wherein the object setting unit displays the third object on all pages or some pages.

4. The electronic document as claimed in claim 2, further driving the computer to execute functions of:
a storage-time object setting unit that sets display attributes of the first object in a display state when the document is stored.

5. The electronic document as claimed in claim 4, wherein the storage-time object setting unit sets display attributes of the second object in a non-displaying state.

6. The electronic document as claimed in claim 2, further driving the computer to execute functions of:
a check unit that checks form of the first data input in the first data input field, and excludes the first data not satisfying predetermined conditions.

7. The electronic document as claimed in claim 2, further driving the computer to execute functions of:
a transmission source display unit that displays addresses of transmission sources for management of transmission of documents even when verification of the verification data is not made.

8. The electronic document as claimed in claim 2, wherein when at least one of the first object, the second object, and the third object includes a plurality of objects, the plural objects are assigned the same object name in a built-in program.

9. The electronic document as claimed in claim 2, further driving the computer to execute functions of:
a status display unit that determines an input status of the first data input field, the second data input field, or the third data input field, and displays an object indicating the determined input status.

10. The electronic document as claimed in claim 2, further driving the computer to execute functions of:
a second object setting unit that, when date and time data given by the computer do not satisfy predetermined conditions, does not set the first object in a non-display state, and does not set the second object and the third object in display states.

11. The electronic document as claimed in claim 2, wherein when there are plural of the first objects, the object setting unit sets some objects of the plural first objects in the non-display state only when a predetermined first data set is input.

12. The electronic document as claimed in claim 2, wherein when there are plural of the second objects, the object setting unit sets some objects of the plural second objects in the display state only when a predetermined first data set is input.

13. An electronic document displayed on a display device of a computer, said electronic document including instructions embodied in a non-transitory computer-readable medium which are executable by the computer to drive the computer to execute functions of:

a setting unit that provides a first input field and a second input field for prompting a user to input verification data to unshield confidential contents in the electronic document, the verification data including user identification, entered in the first input field, and having been provided from a provider of the electronic document to the user, the setting unit calculating a value of a password based on contents of the first input field, said setting unit further providing a first data input field for inputting a first data set, and a second data input field for inputting a second data set;

a sustaining unit that sustains a program in advance, said program automatically generating the second data set from the input first data set;

a determination unit that determines whether the corresponding second data set automatically generated by using the program from the first input data set input into the first data input field is in agreement with the second data set input into the second data input field, and that determines whether the verification data satisfy predetermined conditions and whether the calculated password value is in agreement with contents of the second input field; and a displaying unit that displays the electronic document with the unshielded confidential contents on the display device when the determination unit determines that the verification data satisfy the predetermined conditions, wherein the displaying unit displays the inputted user identification embedded into the electronic document on the display device, and the user is not permitted to edit the user identification embedded into the electronic document, and wherein the calculated password value is a sum of numerical values of character codes of characters entered in the first input field as the user identification.

14. The electronic document as claimed in claim 13, wherein the program uses date and time data given by the computer as elements in a calculation process.

15. A method of representing an electronic document displayed on a display device of a computer, said method comprising the steps of:

providing a first input field and a second input field for prompting a user to input verification data to unshield confidential contents in the electronic document, the verification data including user identification, entered in the first input field, and having been provided from a provider of the electronic document to the user;

calculating a value of a password based on contents of the first input field;

determining whether the verification data satisfy predetermined conditions and whether the calculated password value is in agreement with contents of the second input field;

displaying the electronic document with the unshielded confidential contents on the display device when it is determined that the verification data satisfy the predetermined conditions; and displaying the inputted user identification embedded into the electronic document displayed on the display device, wherein the user is not permitted to edit the user identification embedded into the electronic document, and wherein the calculated password value is a sum of numerical values of character codes of characters entered in the first input field as the user identification.

16. A method of representing an electronic document displayed on a display device of a computer, said method comprising the steps of:

providing a first input field and a second input field for prompting a user to input verification data to unshield confidential contents in the electronic document, the verification data including user identification, entered in the first input field, and having been provided from a provider of the electronic document to the user;

calculating a value of a password based on contents of the first input field;

sustaining a plurality of combinations of a plurality of first data sets and second data sets respectively corresponding to the first data sets in advance;

obtaining the first data set and the second data set via a first data input field and a second data input field, respectively, of the electronic document;

determining whether the verification data satisfy predetermined conditions and whether the calculated password value is in agreement with contents of the second input field;

displaying the electronic document with the unshielded confidential contents on the display device when it is determined that the verification data satisfy the predetermined conditions; and displaying the inputted user identification embedded into the electronic document displayed on the display device, wherein the user is not permitted to edit the user identification embedded into the electronic document, and wherein the calculated password value is a sum of numerical values of character codes of characters entered in the first input field as the user identification.

17. The method as claimed in claim 16, wherein the first object is not set in a non-display state, and the second object and the third object are not set in display states when date and time data given by the computer do not satisfy predetermined conditions.

18. A method of representing an electronic document displayed on a display device of a computer, said method comprising the steps of:

providing a first input field and a second input field for prompting a user to input verification data to unshield confidential contents in the electronic document, the verification data including user identification, entered in the first input field, and having been provided from a provider of the electronic document to the user;

calculating a value of a password based on contents of the first input field;

sustaining a procedure for automatically generating a second data set from an input first data set in advance;

obtaining the first data set and the second data set via a first data input field and a second data input field, respectively, of the electronic document;

determining whether the verification data satisfy predetermined conditions and whether the calculated password value is in agreement with contents of the second input field;

displaying the electronic document with the unshielded confidential contents on the display device when it is determined that the verification data satisfy the predetermined conditions; and displaying the inputted user identification embedded into the electronic document displayed on the display device, wherein the user is not permitted to edit the user identification embedded into the electronic document, and wherein the calculated password value is a sum of numerical values of character codes of characters entered in the first input field as the user identification.

19. The method as claimed in claim 18, wherein date and time data given by the computer are used as elements in a calculation process in the procedure.

20. An electronic document display device for displaying an electronic document and for inputting or outputting data of the electronic document, when the electronic document is displayed on the electronic document display device, the electronic document driving a computer to execute functions of:

a setting unit that provides a first input field and a second input field for prompting a user to input verification data to unshield confidential contents in the electronic document, the verification data including user identification, entered in the first input field, and having been provided from a provider of the electronic document to the user, the setting unit calculating a value of a password based on contents of the first input field, said setting unit further providing a first data input field for inputting a first data set, and a second data input field for inputting a second data set;

a sustaining unit that combines a plurality of the first data sets with the second data sets respectively corresponding to the first data sets and sustains the plural combinations in advance, and that sustains a program in advance, said program automatically generating the second data set from the input first data set;

a determination unit that determines whether the first data set and the second data set respectively input in the first data input field and the second data input field are in agreement with one of the combinations, and that determines whether the verification data satisfy predetermined conditions and whether the calculated password value is in agreement with contents of the second input field;

a displaying unit that displays the electronic document with the unshielded confidential contents on the display device when the determination unit determines that the verification data satisfy the predetermined conditions, wherein the displaying unit displays the inputted user identification embedded into the electronic document on the display device, and the user is not permitted to edit the user identification embedded into the electronic document, and wherein the calculated password value is a sum of numerical values of character codes of characters entered in the first input field as the user identification.

21. A non-transitory computer-readable storage medium wherein an electronic document is stored, when the electronic document is displayed on a display device of a computer, the electronic document driving a computer to execute functions of:

a setting unit that provides a first input field and a second input field for prompting a user to input verification data to unshield confidential contents in the electronic document, the verification data including user identification, entered in the first input field, and having been provided from a provider of the electronic document to the user, the setting unit calculating a value of a password based on contents of the first input field, said setting unit further providing a first data input field for inputting a first data set, and a second data input field for inputting a second data set;

a sustaining unit that combines a plurality of the first data sets with the second data sets respectively corresponding to the first data sets and sustains the plural combinations in advance, and that sustains a program in advance, said program automatically generating the second data set from the input first data set;

a determination unit that determines whether the first data set and the second data set respectively input in the first data input field and the second data input field are in agreement with one of the combinations, and that determines whether the verification data satisfy predetermined conditions and whether the calculated password value is in agreement with contents of the second input field;

a displaying unit that displays the electronic document with the unshielded confidential contents on the display device when the determination unit determines that the verification data satisfy the predetermined conditions, wherein the displaying unit displays the inputted user identification embedded into the electronic document on the display device, and the user is not permitted to edit the user identification embedded into the electronic document, and wherein the calculated password value is a sum of numerical values of character codes of characters entered in the first input field as the user identification.

* * * * *